Figure 1:
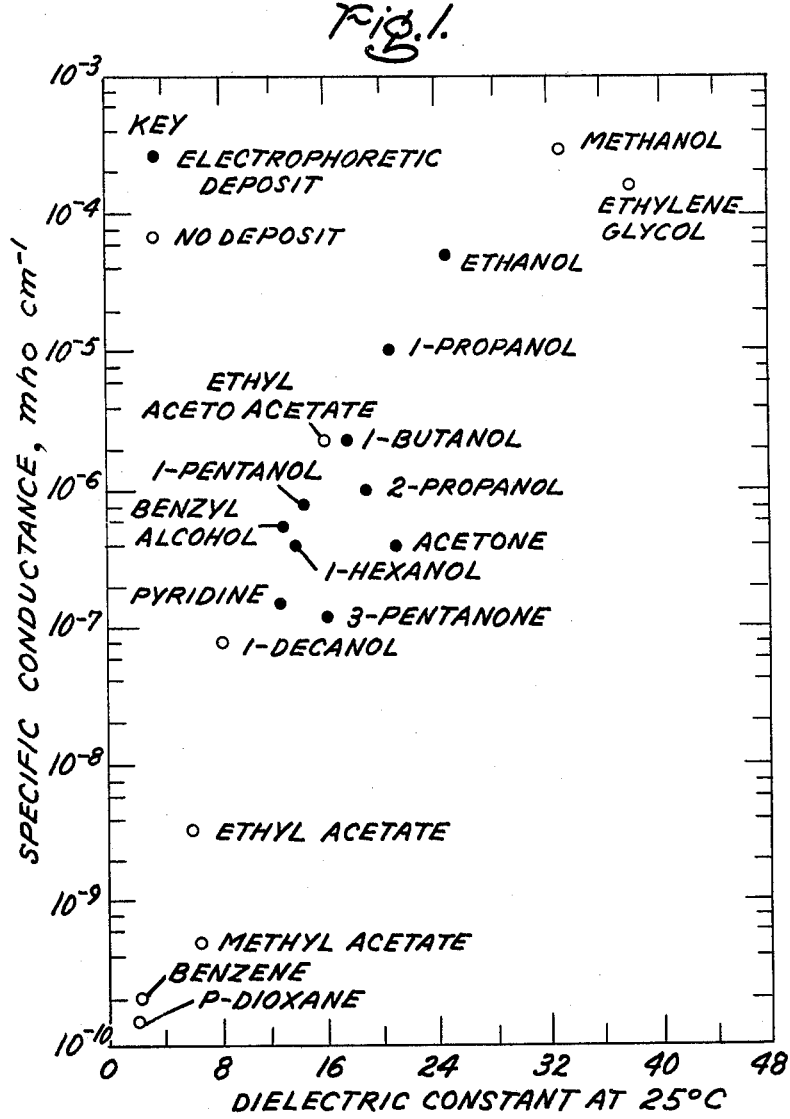

United States Patent [19]
Powers

[11] 3,900,381
[45] Aug. 19, 1975

[54] METHOD OF FORMING BETA-ALUMINA ARTICLES

[75] Inventor: Robert W. Powers, Schenectady, N.Y.

[73] Assignee: General Electric Company, Schenectady, N.Y.

[22] Filed: Sept. 24, 1973

[21] Appl. No.: 400,047

[52] U.S. Cl. .................................. 204/181; 136/153
[51] Int. Cl. ........................ B01k 5/02; C23b 13/00
[58] Field of Search ............ 204/181, 3, 4; 136/153

[56] References Cited
UNITED STATES PATENTS

| | | |
|---|---|---|
| 3,027,313 | 3/1962 | Halstead et al. .................... 204/181 |
| 3,223,607 | 12/1965 | Millner et al. ...................... 204/181 |
| 3,607,436 | 9/1971 | Charles et al. ...................... 136/153 |

*Primary Examiner*—Howard S. Williams
*Attorney, Agent, or Firm*—Paul R. Webb, II; Joseph T. Cohen; Jerome C. Squillaro

[57] ABSTRACT

A method of forming beta-alumina articles includes electrophoretically depositing such material on a mandrel, drying the deposited material, and sintering the dried material. Such articles are useful as containers for sodium and as solid electrolytes in sodium-sulfur and sodium halogen batteries.

9 Claims, 2 Drawing Figures

METHOD OF FORMING BETA-ALUMINA ARTICLES

The present invention relates generally to a method of forming ionically conductive ceramics and is more particularly concerned with an improved method of forming beta-alumina bodies having good electrical and structural characteristics.

Beta-alumina bodies are useful as solid electrolytes in electrical energy storage devices in a variety of combinations of electrode materials useful over a broad range of operating temperature conditions. For example, a high-energy battery employs an anode of sodium and a cathode of sulfur in which both the sodium and sulfur are in the molten state at operating temperature and are in contact with and separated by an electrolyte of a thin, plate-like article or of a closed end tube of sodium beta-alumina. A high-energy battery can also employ in a similar structure an anode of the sodium type and a halogen cathode separated by the same type of sodium beta-alumina electrolyte. Kummer, et al., U.S. Pat. No. 3,404,036 describes the use of a plate-like article of sodium beta-alumina as the solid electrolyte in an energy conversion device. A closed end tube or casing of sodium beta-alumina as the solid electrolyte in a sodium-halogen battery is described in copending patent application Ser. No. 228,082, filed Feb. 22, 1972, now U.S. Pat. No. 3,762,955, for "Sealed Primary Sodium-Halogen Battery."

In French Pat. Addition No. 95,549, which was published on Jan. 22, 1971, there is a discussion of the principal French Pat. No. 1,597,279 of Dec. 27, 1968. Both the principal patent and patent of addition deal with an improved procedure for making thin specimens of sinterable material, in particular ceramic material such as zirconia. Such specimens can be used as solid electrolytes in fuel cells operating at high temperature.

In the principal patent, such specimens are produced by preparing a homogeneous slurry in a solvent containing a binder. This slurry is then applied to a mandrel, covering it with a layer of uniform thickness which should be thicker than the desired final thickness. The covered mandrel is then isostatically pressed. After removing the mandrel, the specimen is sintered according to the principal French patent.

In the principal patent, a slurry has to contain such an amount of sinterable material and has to be of such viscosity, that one gets a layer of uniform thickness on the mandrel by simply dipping it into the slurry for a sufficient period of time. The slurry is made by suspending zirconia, stabilized by addition of yttrium oxide, in demineralized water containing some polyvinyl alcohol. The particle size of the zirconia should be smaller than 1 micron. This suspension is made in a ball mill. It has to be degassed before the dipping process can take place. After dipping, the mandrel covered by the paste-like layer is isostatically pressed. The mandrel is then removed and the pieces are sintered.

The sintering can consist of a first treatment in oxygen atmosphere at temperatures near 1,500°C. This treatment is followed by a second one at 2,000°C or 2,100°C in vacuum or in an inert gas atmosphere. Finally, a third one is made again at 1,500°C in air atmosphere in order to reoxidize the product. As a result, one gets specimens which have a very homogeneous structure and are perfectly leak tight.

The dipping process is a very delicate operation especially if one wants to obtain a very uniform thickness without subsequent machining. The dipping process is still very time consuming, but compared with an earlier method of fabricating thin materials, which consisted of spraying a homogeneous slurry onto a heated mandrel, it is much quicker.

The patent of addition also relates to a procedure for fabricating specimens of sinterable material, in particular ceramic material. The material is first deposited onto a suitable mandrel. This is followed by an isostatic pressing process. Only then can one sinter the samples. The patent of addition discloses the use of electrophoretic deposition to form or shape the material to be sintered. The material is first suspended in a suitable liquid and the particles are given an electric charge. The material is then deposited onto a mandrel placed in this suspension. Deposition of material takes place on applying a potential difference between the mandrel and another electrode. For example, with zirconia, one has to suspend the particles in certain polar organic vehicles. One can use nitromethane as the vehicle to which one adds small amounts of benzoic acid. One can also use a mixture of acetone and ethyl alcohol containing small amounts of nitrocellulose. Once the deposition has been made the operations are continued as described in the principal patent mentioned above. The pieces are isostatically pressed and afterwards sintered.

The patent of addition describes that in order to electrically charge the zirconia particles, one suspends 20 g of zirconia with a grain size smaller than one micron (and which has been stabilized by addition of some yttrium oxide) in 100 g of nitromethane. This suspension is made within 15 minutes at room temperature in a ball mill. Afterwards one gram of benzoic acid is added to the suspension and one again ball mills for about 15 minutes. The suspension of the charged zirconia particles is then transferred to a stainless steel beaker. Constant stirring has to be applied during the deposition. This can be carried out with a magnetic stirrer. One can then deposit the particles onto a mandrel. To do so, one dips the cylindrical, electrically-conducting mandrel into the beaker. The mandrel is rotated. Then one applies a certain potential difference between the mandrel and the stainless steel beaker containing the suspension. This results in the deposition of zirconia particles on the mandrel. The potential difference can be, for example, between 30 and 500 V.

In order to get deposition of zirconia particles onto the mandrel, one has to apply a potential difference of about 300 V between the mandrel and the beaker. A zirconia layer is deposited onto the mandrel when this potential difference is applied. The distance between the external surface of the mandrel and the internal wall of the beaker is about 2 cm. Under these conditions, in order to get a wall thickness of about 200 microns after isostatically pressing and sintering, one has to apply the necessary potential difference for about 5 seconds.

In the case of the zirconia particles suspended in nitromethane, the polarity of the charged particles is positive as inferred from the fact that the polarity of the mandrel has to be negative. On the other hand, when the zirconia particles are suspended in a solution containing one-third acetone and two-thirds ethyl alcohol and containing one percent of nitrocellulose as an organic binder, the polarity of the particles is negative.

As stated in the principal patent, before isostatically pressing the samples, one can cover them with a protective layer which is applied to the outer face. All details given in the principal patent about the isostatic pressing and the sintering also apply to the patent of addition. Deposition by means of electrophoresis has the advantage that a wide variety of desired shapes of mandrels can be used. This allows one to obtain articles other than discs or tubes.

Also according to the patent of addition, it is possible to increase the stiffness of the deposited layers by adding a binder to them. As a binder, one can use dipehnol polycarbonate or ethyl cellulose. Where these compounds are only slightly soluble in the suspension of the ceramic material, they first have to be dissolved in another solvent. The resulting solution is then mixed together with the suspension. For example, in the case of a suspension of zirconia in nitromethane, the polycarbonate is first dissolved in chloroform and afterwards mixed with the suspension. The polycarbonate is only very slightly soluble in the dispersing agent nitromethane. First, a solution containing two to three percent by weight of diphenol polycarbonate in chloroform is prepared. Then 30 to 50 g of this solution is mixed with a suspension containing about 50 g of zirconia. After deposition, the chloroform present in the deposited layer is eliminated during the drying process and the polycarbonate disappears during the sintering process. It is also possible to use a solution of carbon tetrachloride containing about 2 to 3% by weight of ethyl cellulose.

I understand that sodium beta-alumina can be formed in accordance with the above French patent addition. The present invention is directed to an improved method of forming beta-alumina articles which are useful as solid electrolytes in various types of sodium batteries.

The primary object of my invention is to provide an improved method which results in the simplified and reproducible production of beta-alumina articles.

In accordance with one aspect of my invention, a method of forming beta-alumina articles includes providing a suspension of beta-alumina particles the majority of which have a diameter in the range of 1 to 2 microns in an organic liquid vehicle, electrophoretically depositing the particles from the same vehicle onto a mandrel, drying the deposited material, removing the deposit from the mandrel, and sintering the dried material.

Figure 2:
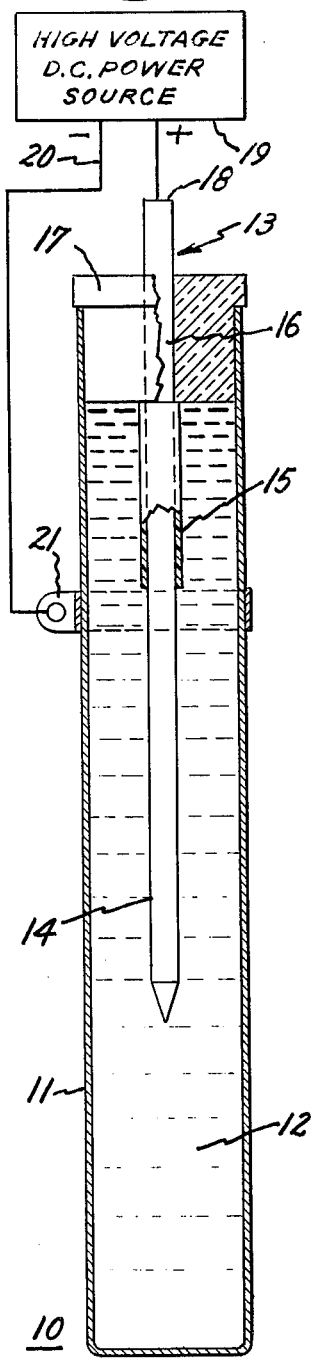

These and various other objects, features and advantages of the invention will be better understood from the following description taken in connection with the accompanying drawing in which:

FIG. 1 is a plot of the electrical conductivity of a number of beta-alumina suspensions prepared with different vehicles versus the dielectric constant of the vehicle at 25°C. The specific conductance is measured in mho cm$^{-1}$; and FIG. 2 is a partial sectional view of the deposition apparatus.

I found a simplified but improved process which eliminated the isostatic pressing, the binders, the benzoic acid addition, the mandrel rotation and the slurry agitation required in the above French patent addition. Each of these recited steps in the French patent addition has disadvantages. The isostatic pressing is a complicated and time consuming step which appears to be used for improving green material strength, or for assistance in material removal from the mandrel or both. The use of binders are employed to strengthen initially the material on the mandrel but they suffer from the disadvantage of making removal of the material from the mandrel difficult. The mandrel rotation and slurry agitation during deposition result in some removal of and uneven deposit of the beta-alumina on the mandrel. It must be very carefully controlled. The benzoic acid addition requires a further controlling of the process.

In providing a simplified but improved process, I commenced with the selection of a suitable vehicle for the dispersion of the beta-alumina particles which was most important since this selection determined whether a deposit was obtained or not and to some extent the viscous qualities of the deposit.

The electrical conductivity of a number of suspensions were compared as a function of the dielectric constant of the vehicle with which the suspension was prepared. In each case, the suspension contained 35 grams of Monofrax H beta-alumina powder suspended in 200 ml of the vehicle. The suspensions had been ball-milled 16 hours with Burundum alumina grinding media. The conductivities were measured in a concentric cylinder arrangement and were computed from the dimensions of the deposition cell, the voltage drop, and the initial current before any appreciable quantity of deposit covered the forming electrode.

Two features on FIG. 1 are noteworthy. The first is that in general the conductivity increases rather sharply with the dielectric constant of the vehicle— approximately seven orders of magnitude rise for a change in the dielectric constant from 2 to 40. The second and perhaps more surprising feature is that electrophoretic deposits were obtained only from vehicles with dielectric constants in the range from about 12 to 24.

The predominant charging mode for the beta-alumina particles used in this work, which leads to negatively charged particles is assumed to be dissociation of sodium cations. The absence of deposition from vehicles such as benzene or p-dioxane is consistent with this interpretation as their low dissociating power would not likely give rise to effective particle charging. On the other hand, with vehicles of high dielectric constant, such as methanol or ethylene glycol, electric fields sufficient for deposition were not likely attained. Experiments had to be conducted at very low voltages because of the high conductivity of the suspension and the current rating of the power supply. A minimum field of the order of 10 V/cm was needed for electrophoretic deposition. Other complications also arise with high dielectric constant vehicles. Their high conductivity is further enhanced by ohmic heating during the passage of current. Deposits formed from vehicles with dielectric constants slightly above 24—for example, from ethanol—tended to be very fluid and to slide off the mandrels. In some instances, this situation made determination of the existence of a deposit very difficult although usually this behavior was accompanied by a sudden large increase in current for constant applied cell potential. Anodic film formation on mandrels was also noted with vehicles of high dielectric constant.

The importance of the dielectric constant in the selection of a vehicle was confirmed by the observation of beta-alumina deposits from an equal volume mixture of methanol and p-dioxane although deposition did not occur from these liquids separately. In other experiments, deposition was obtained from a technical grade methyl acetate, containing approximately 15 percent methanol, but not from the reagent grade ester.

Following initial experiments with a large number of vehicles and mixtures of vehicles, nearly all subsequent work was carried out with a preferred vehicle n-amyl alcohol (1-pentanol). Its dielectric constant is 13.9. With it, neither the formation of anodic films on the mandrels nor that of fluid deposits was observed.

After selection of suitable organic liquids as shown in FIG. 1, methods for control of the electric charge on the particles, and milling procedures were determined. The milling or grinding of beta-alumina/n-amyl alcohol suspensions is carried out for two very different purposes: to develop a suitable charge on the particle surfaces and secondly to facilitate production of dense ware during sintering by use of suitably small particle sizes. Beta-alumina powders are charged positively when first placed in n-amyl alcohol, presumably as a result of water adsorption from the atmosphere. The adsorption of protons or conceivably other cations giving rise to positively charged particles is another charging mode for beta-alumina particles and has been used in the French process described above. Water is a troublesome impurity. The vehicle must be free of water. I have found that when I use Monofrax H beta-alumina that the material was sufficiently water free when converted to powder to be employed directly in the vehicle. However, I found that when I employed Alcoa XB-2 beta-alumina, it was necessary to further dry the powder prior to employment in the vehicle. While various drying approaches can be employed, I found that I could accomplish the necessary drying of this material by heating the beta-alumina up to 1,400°C in an air or oxygen atmosphere for a period of about 24 hours. During milling the positive charge is first neutralized and subsequently a negative charge develops after 2 to 8 hours, depending on the powder, grinding media, and the method of milling. It is assumed that, during milling, fresh beta-alumina surfaces are produced by fracture beneath the n-amyl alcohol where contamination by water is unlikely. Unlike the sintering behavior, charge on the particles is not affected for times greatly in excess of that required to develop a negative charge.

The milling problem involved the need to develop procedures to produce an adequately small particle size without incurring appreciable wear of the grinding media.

Both alpha-alumina and zirconia were employed separately as grinding media. Various beta-alumina materials containing soda over a wide range from 6.2 to 9 weight percent soda can be employed in my process. Beta-aluminas, such as Monofrax H beta-alumina and Alcoa XB-2 beta-alumina have been used. Monofrax H beta-alumina is a commercial product of the Carborundum company, Falconer N.Y., which material is a fused product usually available in the form of bricks. XB-2 beta-alummina is a commercial product of Alcoa Company, New York, N.Y., which material is available in the form of powder. The Monofrax H beta-alumina bricks were jaw-crushed, ball-milled dry with alpha-alumina balls, and then screened to provide powder in the range of $44\mu$ to $105\mu$. Additives, of the order of a weight percent, were often added to both types of beta-alumina powders. These included, for example, additional soda by way of anhydrous sodium carbonate as well as magnesia from basic magnesium carbonate. Appropriate quantities of the additives in powder form were mixed thoroughly with the beta-alumina powder by tumble mixing for 24 to 48 hours. The resulting mixture of powders was calcined in an oxygen atmosphere for 24 hours at 1,400°C. This calcination provides the above-mentioned drying for the Alcoa XB-2 powder. Such calcined material served as the starting powder for the deposition work.

Reduction in size of the starting powder and electrical charging of the particles were carried out simultaneously by milling under the vehicle, i.e., the organic liquid in which the beta-alumina particles are suspended during deposition. Various kinds of milling were examined in the course of this work. Very satisfactory results were obtained with ball milling.

Milling has been carried out in 32 oz wide-mouth polyethylene bottles. Their use as mill jars reduces contamination since any abraded material is burned out during sintering. These containers were half-filled with grinding media, either 1,100 grams of alumina media or 1,800 grams of zirconia. When suspensions were milled the volume of the vehicle was 200 ml. The amount of starting powder in the charge ranged from 35 to 200 grams. Milling was done on a commercial jar mill.

The following is a preferred milling process. A friable powder such as Alcoa XB-2 beta-alumina is used. Milling is carried out at a high powder concentration, e.g., 200 grams per 200 ml n-amyl alcohol vehicle. The suspension is milled in a clean polyethylene jar. Zirconia is used in preference to alpha-alumina media. If slight contamination by zirconia is intolerable, a 91% alumina media is employed.

In FIG. 2 of the drawing, there is shown a partial sectional view of the electrophoretic deposition apparatus for carrying out my invention. The equipment is shown generally at 10 which comprises a stainless steel vessel 11 which functions as a counter-electrode filled with a suspension designated generally at 12 which includes the milled beta-alumina particles, and the n-amyl alcohol vehicle. This suspension is transferred from the polyethylene jar after the grinding or milling has been accomplished.

A stainless steel mandrel 13 has a deposition portion 14, tape 15 surrounding a non-deposition portion, a portion 16 fitted within an electrically insulating cover 17 for vessel 11, and a portion 18 extending outwardly from cover 17. A high voltage source 19 is connected by a negative (—) lead 20 to a clamp 21 attached to vessel 11 thereby making vessel 11 the negative counter-electrode. Portion 14 of mandrel 13 is made the positive electrode (+) by connection of a positive lead from source 19 to portion 18 of mandrel 13. A current meter, a current recorder and a charge indicator (not shown) are connected in series with power source 19. The high voltage source is a standard commercial device which has been used to apply voltages in the range 200 to 1,000V between mandrel 13 and counter-electrode 11. Such voltages correspond to fields between 100 and 10,000 V/cm. It is preferred practice to use the highest fields permitted by the power supply. This procedure usually reduces deposition times to about a minute and makes stirring of the suspension unnecessary during deposition.

Deposition in electrophoretic forming is carried out as is conventional in the art by applying a DC voltage from power source 19 between portion 14 of mandrel 13 and counter-electrode 11. Tape portion 15 can be of a different length or eliminated depending on the length of the beta-alumina closed end tube desired. Suitable tapes include 3M Company No. 471 plastic tape and Teflon polymer. Difficulties were encountered with paper masking tape as well as silicone rubber. Open end tubes are produced by applying the same tape on the lower end of a non-tapered mandrel. Other beta-alumina articles have been produced in disc and pocket-shaped configurations by using a correspondingly shaped mandrel under similar conditions. In addition to stainless steel, the mandrels have been made of nickel and Invar alloy. Other suitable materials for deposition vessels include polyethylene and glass which would require a counter-electrode therein. Plexiglass plastic containers were unsuitable. After a deposition time of approximately 1 minute, a beta-alumina article is formed on portion 14 of mandrel 13.

The need for removal of deposits from mandrels after forming involves some problems not encountered in the use of electrophoretic deposition for coating purposes. These problems have been treated in very different ways in previous applications of electroforming. Alpha-alumina has been removed from aluminum formers with a polyvinyl chloride sheath metallized on its outer surface and dusted with talc on its inner surface. This sheath covered the former during deposition and subsequently deposit and sheath together were slid off the aluminum former. On the other hand, the above French Patent Addition removed zirconia and beta-alumina closed-end tubes from aluminum mandrels after isostatic pressing. I found unexpectedly that satisfactory removal of deposits depends on the nearly complete elimination of vehicle from the deposit. Two kinds of problems are encountered in securing the satisfactory release of green beta-alumina deposits from mandrels—those related to sticking and those associated with cracking. Release of green deposits in the form of closed-end tubes can usually be accomplished after drying overnight in air at room temperature. At most 24 hours are needed. However, up to three days of drying may be required for the 3mm-thick deposits formed on larger mandrels such as the one for forming pocket-shaped pieces.

The drying of green deposits can be accelerated by treatment in a vacuum oven. However, greater care must then be exercised in the choice of mandrel material. For example, if a stainless steel mandrel is used for forming tubes, a large fraction of the deposits will usually crack. Presumably such cracking arises from the greater coefficient of expansion of the steel, thus placing the deposit in tension. It does not occur with mandrels of Invar alloy which has a coefficient of expansion near zero over the temperature range 0° to 200°C. Cracking was also encountered sometimes in early work with coarse deposits from suspensions that had been milled an insufficient length of time as well as with deposits that had undergone viscous flow.

Sintering of green beta-alumina ware has been carried out in various manners including alpha-alumina saggers usually covered with a bed of coarse Monofrax beta-alumina particles in molybdenum-wound furnaces. The saggers are heated inside a dense alpha-alumina tube filled with either an oxygen or an air atmosphere. This protects the ware from the hydrogen atmosphere which needs to envelop the furnace muffle to prevent molybdenum oxidation. Sintering has been done between 1,700° and 1,825°C.

The properties of sintered beta-alumina depend on details associated with each of the three major fabrication steps: the preparation of starting powders, the forming of green ware, and finally the sintering procedure. When sintering is carried out at temperatures between 1,725° and 1,825°C for times ranging from a few minutes to a few hours in an oxygen oxidizing atmosphere, such as air or oxygen, densities ranging from 2.98 to 3.26 g/cc are obtained on single-phase material. These values correspond to residual closed porosity from 10 to less than 1 percent.

Examples of beta-alumina articles made in accordance with the method of my invention are as follows:

EXAMPLES I–XVIII

In Examples I–XVIII, 18 closed end tubes of beta-alumina were prepared. Three separate suspensions were prepared from each of which six closed end tubes were made. Each suspension contained 150 grams of Alcoa XB-2 powder in 300 ml of n-amyl alcohol. These materials were milled for 18 hours using 1,800 grams zirconia cylinders in a polyethylene jar. Subsequently, each suspension was transferred to a separate stainless steel vessel as described above and as shown in FIG. 2 of the drawing.

A mandrel was employed as shown in FIG. 2 with an exposed surface portion having a length of 4.5 inches. A DC electric field of 1,980 volts per centimeter was applied initially from the power source across the mandrel as the positive electrode and across the vessel as the negative electrode. The tubes, which are numbered 1–18, correspond to Examples I–XVIII. In Table I below, the tubes, deposition time, suspension, and amount of deposited beta-alumina are set forth. Six tubes were made from each suspension.

TABLE I

| Tube No. | Deposition-Time-Seconds | Suspension No. | & Mass in Grams |
|---|---|---|---|
| 1 | 40 | 1 | 12.49 |
| 2 | 46 | 1 | 13.16 |
| 3 | 53 | 1 | 13.38 |
| 4 | 64 | 1 | 14.06 |
| 5 | 82 | 1 | 14.78 |
| 6 | 115 | 1 | 14.92 |
| 7 | 40 | 2 | 12.39 |
| 8 | 46 | 2 | 12.95 |
| 9 | 53 | 2 | 13.11 |
| 10 | 64 | 2 | 13.51 |
| 11 | 82 | 2 | 13.17 |
| 12 | 115 | 2 | 14.67 |
| 13 | 40 | 3 | 12.08 |
| 14 | 46 | 3 | 12.66 |
| 15 | 53 | 3 | 13.14 |
| 16 | 64 | 3 | 13.67 |
| 17 | 82 | 3 | 14.59 |
| 18 | 115 | 3 | 14.96 |

After the above depositions each closed end tube was air dried for 24 hours on its respective mandrel. Each closed end tube was then removed from its mandrel and sintered as above described at a temperature of 1,800°C for a period of 5 minutes. The resulting closed-end tubes were beta-alumina articles made in accordance with my invention.

While other modifications of the invention and variations thereof which may be employed within the scope of the invention have not been described, the invention is intended to include such as may be embraced within the following claims.

What I claim as new and desire to secure by Letters Patent of the United States is:

1. A method of forming a beta-alumina article which comprises providing a suspension consisting of beta-alumina particles the majority of which have a diameter in the range of 1 to 2 microns in an organic fluid having a dielectric constant at 25°C of from 12 to 24, electrophoretically depositing the beta-alumina particles from the suspension as a dense deposit onto a charged electrode in a DC electric field of from 100 to 10,000 volts per centimeter, drying the deposit on the electrode, removing the deposit from the electrode, and sintering the deposit in an oxygen oxidizing atmosphere at a temperature between 1,700° and 1,825°C resulting in a dense, sintered beta-alumina article.

2. A method of forming a beta-alumina article as in claim 1, in which the organic fluid is n-amyl alcohol having a dielectric constant of 13.9.

3. A method of forming a beta-alumina article as in claim 1, in which the initially applied DC electric field is 1,980 volts per centimeter.

4. A method of forming a beta-alumina article as in claim 1, in which the deposit is dried in air for 24 hours.

5. A method of forming a beta-alumina article as in claim 1, in which the sintering temperature is 1,800°C.

6. A method of forming a beta-alumina article as in claim 1, in which the organic fluid is n-amyl alcohol with a dielectric constant of 13.9, the initial DC electric field is 1,980 volts per centimeter, the deposit is dried in air for 24 hours, and the sintering temperature is 1,800°C.

7. A method of forming a beta-alumina article which comprises mixing together beta-alumina particles of a diameter larger than 20 microns with an organic liquid having a dielectric constant at 25°C of from 12 to 24, adding to the mixture grinding media selected from the class consisting of zirconia and alumina, milling the mixture thereby reducing the beta-alumina particles whereby a majority of which have a diameter in the range of 1 to 2 microns and forming a suspension with the organic fluid, providing a first electrode for deposition, and another electrode for contact with the suspension, electrophoretically depositing the beta-alumina particles onto the first electrode in a DC electric field of from 100 to 10,000 volts per centimeter, drying the deposit on the electrode, removing the deposit from the electrode, and sintering the deposit in an oxygen oxidizing atmosphere at a temperature between 1,700 and 1,825°C resulting in a dense, sintered beta-alumina article.

8. A dense, sintered beta-alumina article made in accordance with the method of claim 1.

9. A dense, sintered beta-alumina article made in accordance with the method of claim 7.

* * * * *